US009038294B2

(12) United States Patent
Meza

(10) Patent No.: US 9,038,294 B2
(45) Date of Patent: May 26, 2015

(54) LIGHTED SIGNS FOR PASSENGER VEHICLES

(71) Applicant: LOGOLIGHTS, INC., Santa Clarita, CA (US)

(72) Inventor: Matthew Meza, Santa Clarita, CA (US)

(73) Assignee: Logolights, Inc., Santa Clarita, CA (US)

( * ) Notice: Subject to any disclaimer, the term of this patent is extended or adjusted under 35 U.S.C. 154(b) by 0 days.

(21) Appl. No.: 14/452,267

(22) Filed: Aug. 5, 2014

(65) Prior Publication Data

US 2015/0047237 A1 Feb. 19, 2015

Related U.S. Application Data

(60) Provisional application No. 61/865,887, filed on Aug. 14, 2013, provisional application No. 61/900,601, filed on Nov. 6, 2013.

(51) Int. Cl.
*G09F 21/04* (2006.01)
*G09F 13/06* (2006.01)
*G09F 13/00* (2006.01)
*B60R 11/00* (2006.01)
*G09F 17/00* (2006.01)
*G09F 13/04* (2006.01)
*G09F 7/04* (2006.01)
*G09F 13/08* (2006.01)

(52) U.S. Cl.
CPC ............... *G09F 13/06* (2013.01); *G09F 21/04* (2013.01); *G09F 13/005* (2013.01); *B60R 2011/004* (2013.01); *G09F 17/00* (2013.01); *G09F 2013/044* (2013.01); *G09F 21/048* (2013.01); *G09F 7/04* (2013.01); *G09F 13/08* (2013.01)

(58) Field of Classification Search
CPC ....... G09F 21/04; G09F 17/00; G09F 21/048; G09F 7/04; G09F 13/08; G09F 2013/044; G09F 13/06; G09F 13/005; B60R 2011/004
See application file for complete search history.

(56) References Cited

U.S. PATENT DOCUMENTS

| | | | |
|---|---|---|---|
| 5,396,408 A * | 3/1995 | Szczech, III | 362/397 |
| 5,724,161 A * | 3/1998 | Smith et al. | 359/13 |
| 6,860,047 B1 * | 3/2005 | Rodriguez | 40/591 |
| D656,994 S | 4/2012 | Podd | |
| D657,424 S | 4/2012 | Podd | |
| D657,425 S | 4/2012 | Podd | |
| D660,367 S | 5/2012 | Podd | |
| D660,368 S | 5/2012 | Podd | |
| D660,369 S | 5/2012 | Podd | |
| D660,370 S | 5/2012 | Podd | |
| D660,913 S | 5/2012 | Podd | |
| D661,745 S | 6/2012 | Podd | |
| D662,146 S | 6/2012 | Podd | |
| D665,030 S | 8/2012 | Podd | |
| D681,738 S | 5/2013 | Richmond | |
| D681,739 S | 5/2013 | Richmond | |
| 8,646,194 B2 | 2/2014 | Podd | |
| 8,893,416 B1 * | 11/2014 | McKenzie | 40/591 |

(Continued)

*Primary Examiner* — Shin Kim
(74) *Attorney, Agent, or Firm* — Kelly & Kelley, LLP

(57) ABSTRACT

A lighted sign for a passenger vehicle includes a decal affixed to an exterior of a window and a lamp housing affixed to an interior surface of the vehicle window immediately opposite the decal. The lamp housing includes an electronics module that illuminates the decal only when the vehicle is moving and when there is insufficient exterior light to clearly see the exterior decal. The decal and design are removable and replaceable.

20 Claims, 9 Drawing Sheets

(56) References Cited

U.S. PATENT DOCUMENTS

| | | |
|---|---|---|
| 2003/0192217 A1* | 10/2003 | Anderson et al. ............... 40/591 |
| 2005/0028415 A1* | 2/2005 | Rodriguez ...................... 40/597 |
| 2006/0103638 A1 | 5/2006 | Podd |
| 2008/0285219 A1 | 11/2008 | Podd et al. |
| 2009/0033648 A1 | 2/2009 | Podd et al. |
| 2011/0121957 A1 | 5/2011 | Podd et al. |
| 2011/0265360 A1 | 11/2011 | Podd et al. |
| 2011/0317448 A1 | 12/2011 | Podd |
| 2013/0099698 A1 | 4/2013 | Podd |

\* cited by examiner

LIGHTED SIGNS FOR PASSENGER VEHICLES

RELATED APPLICATION

This application claims the benefit of U.S. Provisional Application No. 61/900,601, filed on Nov. 6, 2013, and U.S. Provisional Application No. 61/865,887, filed Aug. 14, 2013.

FIELD OF THE INVENTION

The present invention relates generally to lighted signs for passenger vehicles. In particular, the present invention is directed to selectively illuminated window-mounted decals.

BACKGROUND OF THE INVENTION

Passenger vehicles have long been utilized to display personal, humorous, political and commercial messages. The common display is, perhaps, the traditional bumper sticker. Bumper stickers are commonly utilized during political campaigns to promote a particular candidate or issue, and are often applied by individuals to promote a particular hobby, social view or favorite organization.

More recently, flexible magnetic signs have been developed which securely but releasably adhere to, for example, the exterior panel of the door of a passenger vehicle. Such magnetic signs are often applied to a personal vehicle to promote the owner's personal business. An advantage of such signs is that when the vehicle is being used for non-business purposes, the sign may be easily removed and reused at a later time.

Decals have also been applied to the windows of vehicles for all of the same reasons discussed above. The primary drawback with decals, bumper stickers and magnetic signs is that they are not visible at night unless directly illuminated by a light source, such as the headlights of another vehicle.

In an effort to provide a vehicle-associated message visible at night, there have been some attempts to fashion illumination sources, such as LED lights, which are affixed to some part of the passenger vehicle. However, this approach tends to create an apparatus that is either too-bulky or expensive for regular use in connection with passenger vehicles, or relies on direct illumination of signs which is in violation of certain vehicle codes.

A recent attempt at providing an illuminated window-mounted decals has been marketed under the POWERDECAL trademark. This device comprises a logo mounted within a housing which contains a power source and light source. The entire housing is mounted to the inside of a vehicle window such that the logo is visible through the window. At night, the power source activates an internal light source which is directed about the periphery of the decal. While this does provide some visibility to the decal during the night time, there are several disadvantages to the POWER-DECAL™ design. Notably, because the decal is situated within a housing which is mounted to the inside of a window, if the window is tinted it is very difficult to see the intended display through the window during daylight hours. Moreover, because the decal is only illuminated about its periphery (and not necessarily along the design lines of the decal), night time visibility of the decal design is also limited.

Accordingly, there is a need for lighted signs for passenger vehicles which are relatively inexpensive, provide good visibility of the decal design during normal lighting conditions, and also provide excellent visibility of the decal design during night time conditions. The present invention fulfills these needs and provides other related advantages.

SUMMARY OF THE INVENTION

The present invention is directed to a lighted sign for a vehicle. More particularly, the invention is directed to an illuminated lighted sign for installation on a window of a vehicle. The lighted sign comprises a decal disposed on an exterior surface of the window of the vehicle. The decal includes a design disposed on a front face, which design has an ornamental configuration. A lamp housing is disposed on an interior surface of the window underlying the decal. A front face of the lamp housing adjacent to the window has an opaque portion and a non-opaque portion. The non-opaque portion has a shape similar to the decal or the design thereon. An illumination source is disposed in the lamp housing and configured to illuminate the front face of the lamp housing.

The decal preferably comprises a translucent or transparent substrate configured to transmit light from the illumination source. Furthermore, the design preferably comprises an opaque color or dark translucent color, where a portion of the substrate extends from every edge of the ornamental configuration. The illumination source preferably includes an on/off switch, a light sensor, and a motion sensor, all of which are connected to a power source. The power source preferably comprises a battery in the lamp housing or the vehicle engine compartment.

The non-opaque portion of the front face of the lamp housing is preferably transparent, translucent, or of a predetermined color. The lamp housing preferably comprises a removable and replaceable mask defining the opaque portion and non-opaque portion of the front face of the lamp housing. In this instance, the lamp housing may comprise a tray and a fastening ring removably affixed to the tray. The tray and fastening ring are configured to removably retain the mask and a transparent sheet therebetween.

The decal is preferably removable and replaceable with an alternate decal having a different design with a different ornamental configuration. In addition, the front face of the lamp housing is preferably replaceable with an alternate front face having a different opaque portion and a different non-opaque portion, wherein the different non-opaque portion has a shape similar to the alternate decal or the different design.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
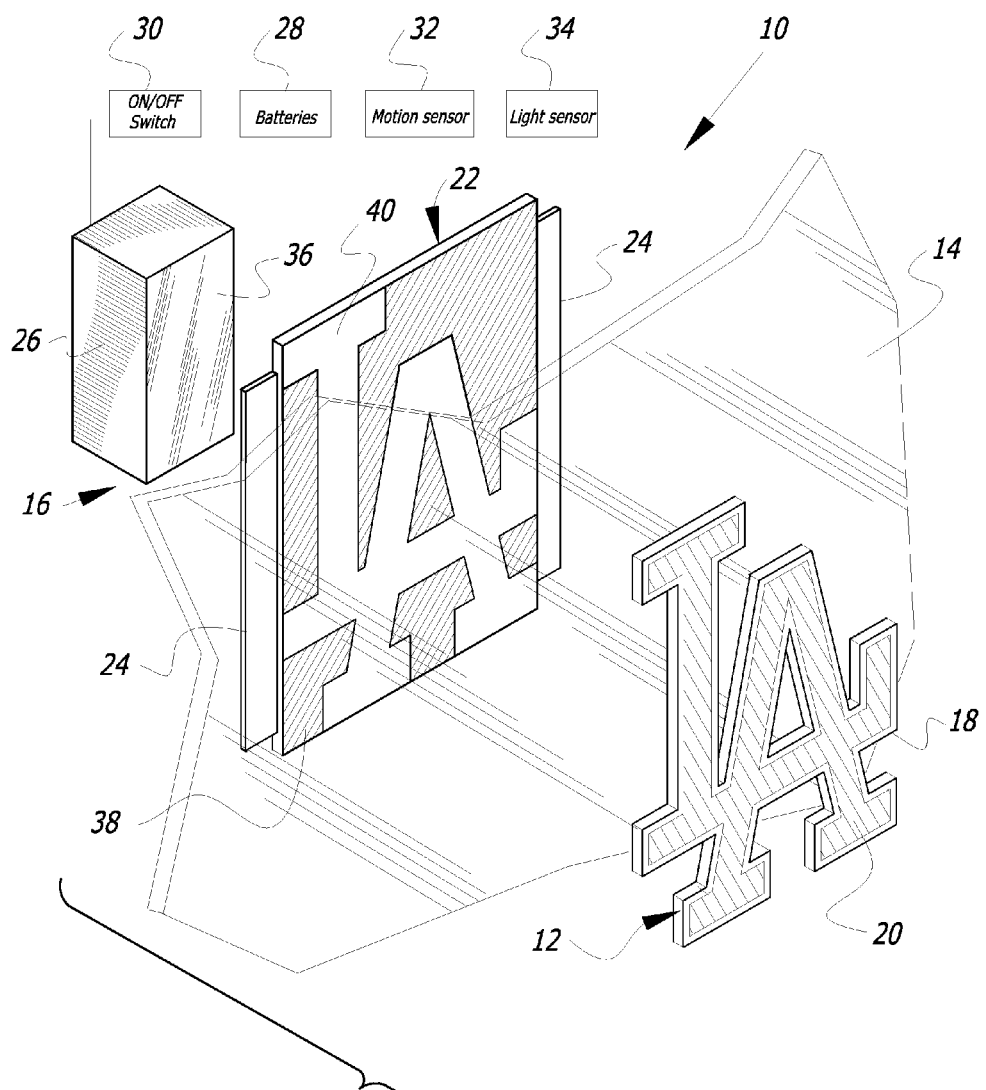
FIG. 1 is an exploded perspective view of a lighted sign for passenger vehicles in accordance with the present invention.
Figure 2:
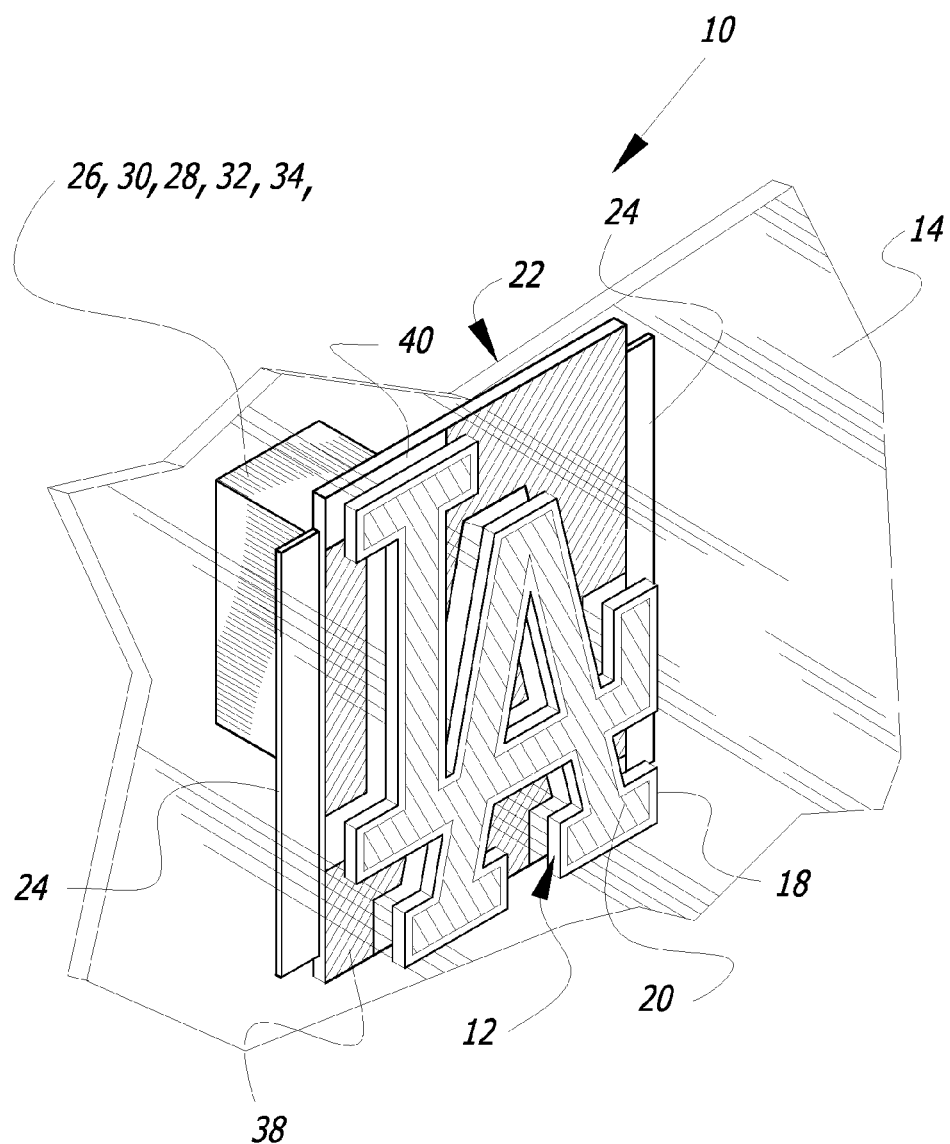
FIG. 2 is a view of the components shown in FIG. 1, assembled to the window of a passenger vehicle.
Figure 3:
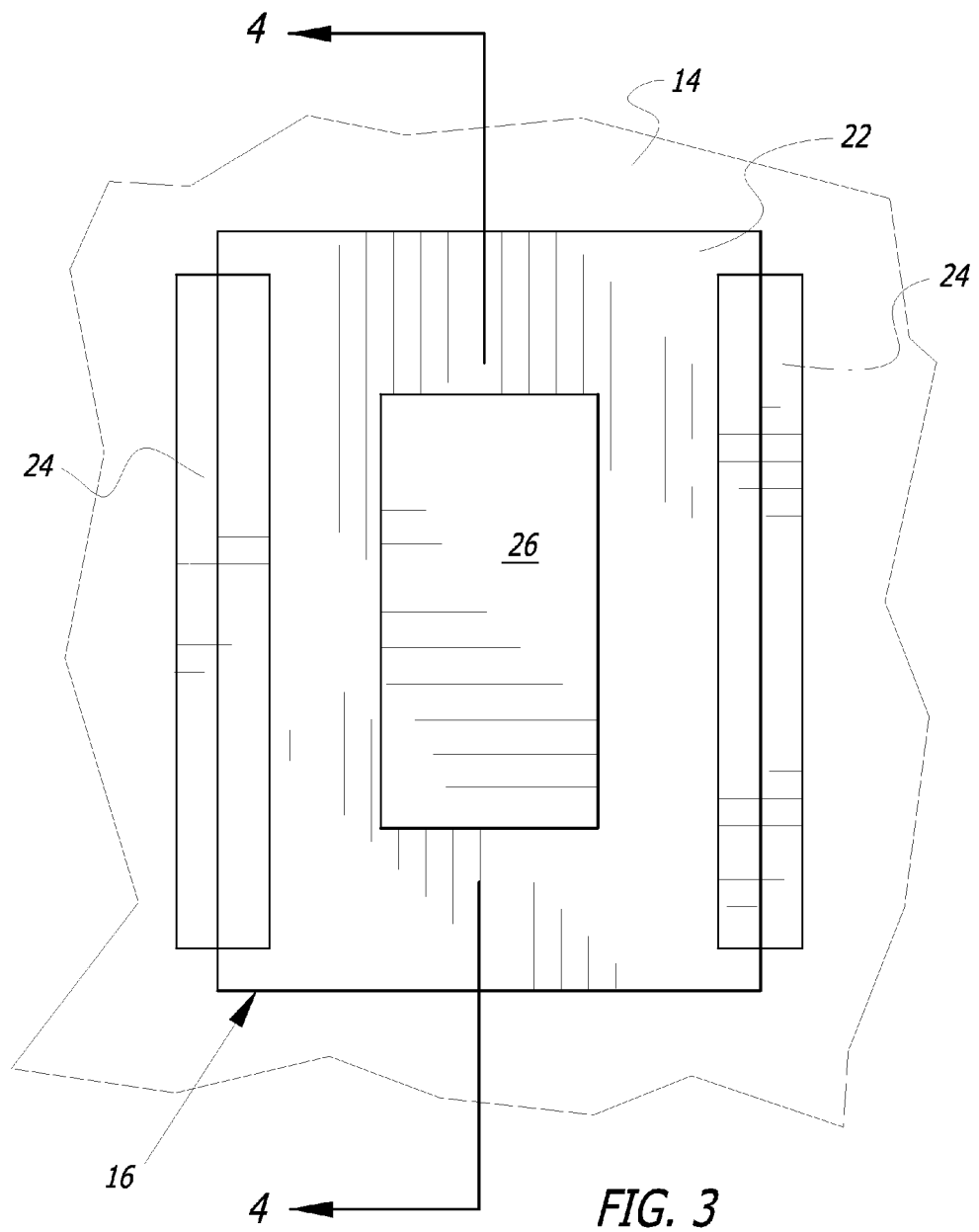
FIG. 3 is a rear elevational view of the structure of FIG. 2.
Figure 4:
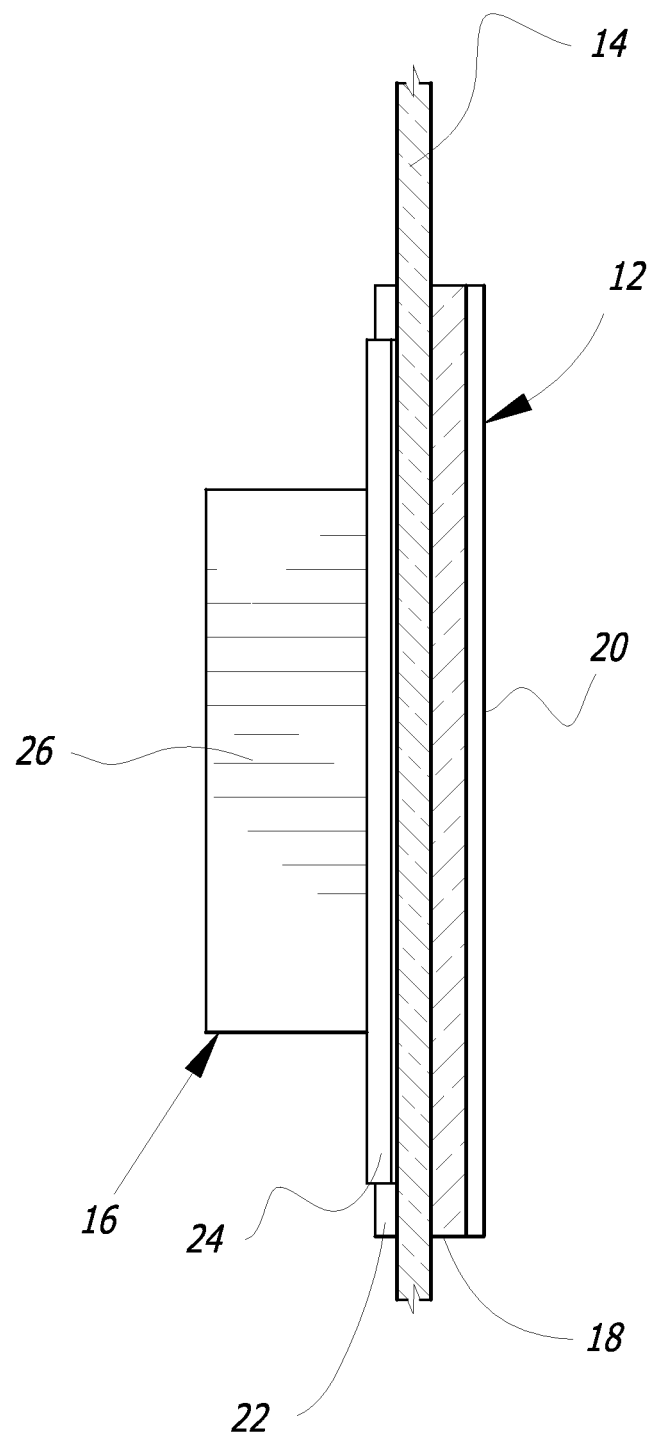
FIG. 4 is a sectional view taken generally along line 4-4 from FIG. 3.
Figure 5:
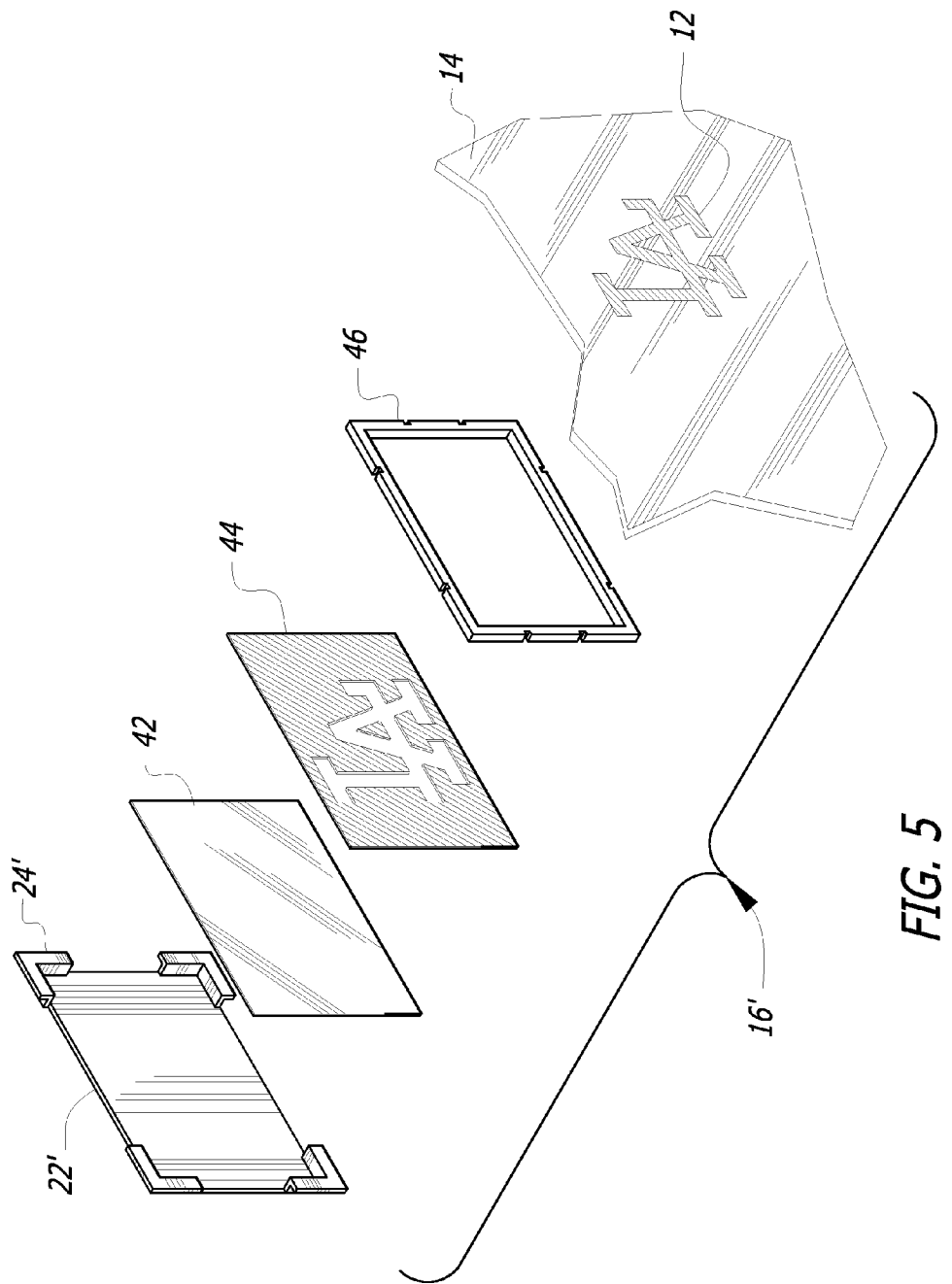
FIG. 5 is an exploded perspective view of another embodiment of the tray 22 of the lamp housing 16 shown in FIGS. 1-4.
Figure 6:
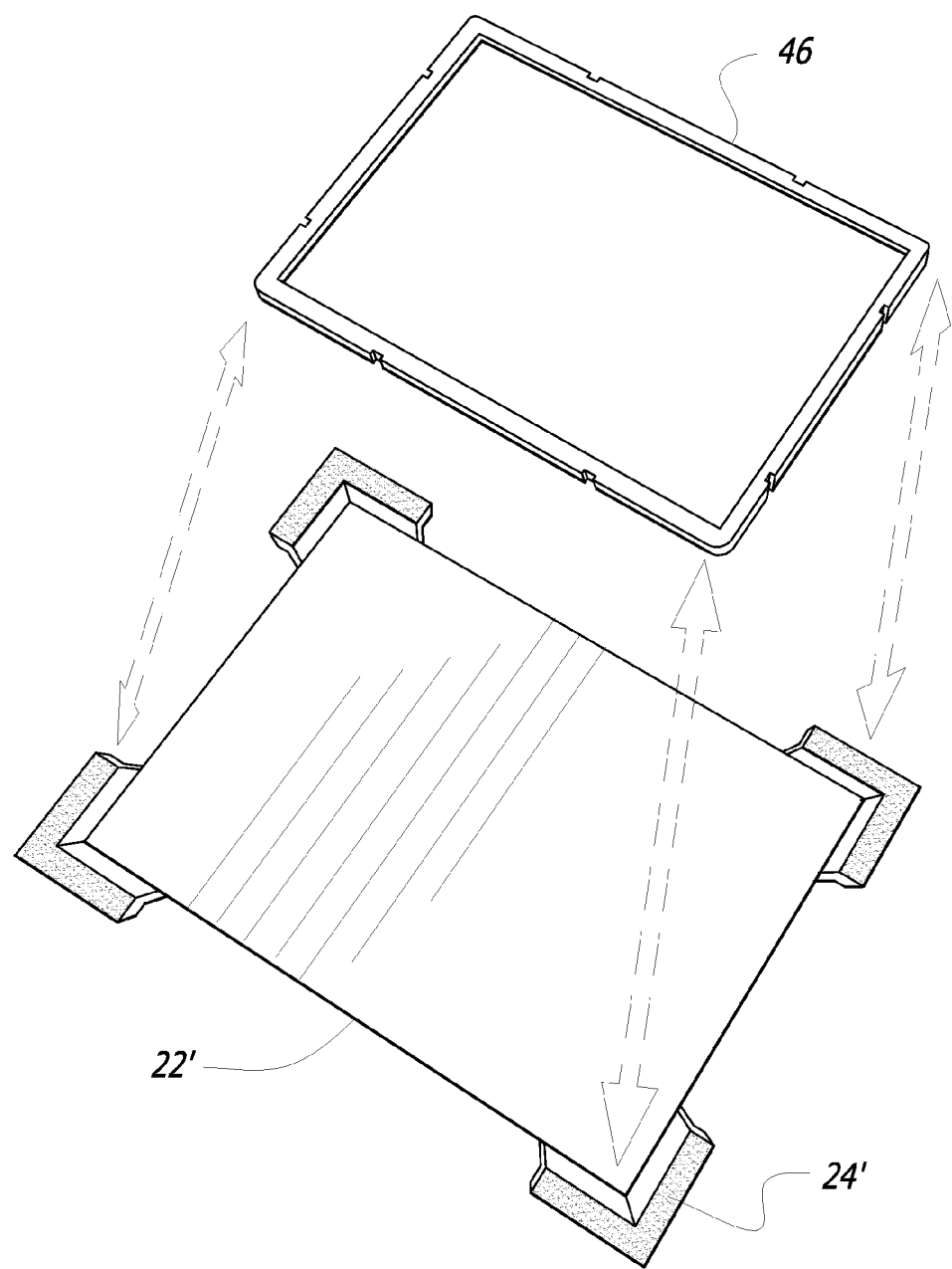
FIG. 6 is an exploded perspective view showing assembly of a fastening frame to the tray 22 during assembly of the components of FIG. 5.

As shown in the drawings for purposes of illustration, the present invention for is directed to a lighted sign for passenger vehicles, referred to generally by the reference number 10. The lighted sign 10 comprises a decal 12 mounted to the exterior of a vehicle window 14, and a lamp housing 16 mounted to the interior of the window 14 immediately opposite the decal 12.

Although the decal 12 shown in the accompanying figures resembles the logo for the Los Angeles Dodgers, it should be understood that the decal may be made in the shape of any logo or design. The decal 12 may comprise a polycarbonate or acrylic substrate 18 approximately 1/16 inch thick formed generally in the overall shape of the logo or design. This substrate 18 is preferably translucent so as to transmit light when illuminated from the rear by the lamp housing 16. The decal 12 is not restricted to the specific embodiment shown. In particular, the decal may be comprised of a flexible thin translucent substrate of any suitable material. A clear adhesive covers the back of the decal 12 so that it may be firmly affixed to the window 14 of the vehicle. On the front face of the decal 12, the design 20 is applied so that all peripheral edges of the design, including interior edges if part of the design 20, have a portion of the translucent substrate 18 which extends therefrom, for purposes to be explained below. The design 20 itself is preferably of an opaque color easily seen during daylight hours, but which will prevent the transmission of light directly therethrough from the rear. Alternatively, the design 20 itself may be of a dark translucent color which is similarly easily seen during daylight hours, but which, advantageously, allows the transmission of some light therethrough from the rear when illuminated during night time hours.

The lamp housing 16 comprises a relatively rigid tray 22 having adhesive strips 24 on opposite sides thereof for adhering the housing to the interior of the vehicle window 14. The adhesive strips 24 may be replaced with another type of fastening material, such as 3M Dual-Lock™ material. An electronics module 26 is fixed to the rear surface of the tray 22. The electronics module 26 includes batteries 28, an on/off/auto switch 30, a motion sensor 32 and a light sensor 34. The tray 22 also includes an illumination source 36 powered by the batteries, for illuminating the front face of the tray. In an alternate embodiment, the battery may be replaced with a 12 volt DC power source from the automobile.

The front face of the tray includes an opaque covering 38 configured so as to permit light to emit from the front face of the tray only directly behind the opaque features or design 20 of the exterior decal 12. The non-opaque or light emitting area 40 of the front face of the tray may be transparent, translucent, and further having a desired color.

To assemble the lighted sign 10 to the window 14 of a passenger vehicle, the lamp housing 16 is positioned adjacent to the inside of the window at the desired location, and then the adhesive strips 24 are pressed against the window to hold the lamp housing 16 in place. A non-stick covering is then removed from the clear adhesive covering the back of the decal 12, and then the decal 12 is aligned over the exterior of the window 14 directly over the lamp housing 16. The design of the decal 12 is carefully aligned with the non-opaque portion 40 of the front face of the tray 22 so that the decal 12 is in perfect alignment with the design of the lamp housing 16.

With the non-opaque portion 40 of the front face of the tray 22 in perfect alignment with the opaque portion on the face of the decal 12, as the front face of the tray is illuminated, no direct light is viewable through the decal 12. However, because the decal substrate 18 is translucent, indirect light illuminates the outline of the decal 12 making it clearly visible at night.

The electronics module 26 is activated by switching the on/off/auto switch 30 to the "auto" position. The batteries 28 power the illumination source 36, but the illumination source is not activated unless two conditions are met, namely, that it is dark and that the vehicle is moving. This is the function of the motion sensor 32 and the light sensor 34 disposed within the electronics module 26.

Accordingly, it will be appreciated that the novel structure for lighted sign for passenger vehicles addresses all of the drawbacks associated with prior art designs. In particular, because the decal 12 is located on the exterior of the vehicle window 14, it is clearly visible during daylight hours. There is no hindrance in viewing the decal 12 that may be introduced by placing it behind a tinted window.

Power is conserved by only actuating the light source 36 when the vehicle is in a darkened environment and when the vehicle is moving.

FIGS. 5-10 illustrate another embodiment of the lamp housing 16 of the present invention. For simplicity, functionally equivalent components of the embodiment of FIGS. 1-4 will retain the same numbers in the description of the embodiment of FIGS. 5-10.

The lamp housing 16' of FIGS. 5-10 differs from the lamp housing 16 of FIGS. 1-4 in that it is constructed in a manner intended to be removed from its existing location on the interior of the vehicle window 14 so as to permit the changing of the image to be displayed by the lighted sign. In this embodiment, the lighted sign 10 still comprises a decal 12 mounted to the exterior of the vehicle window 14 and a lamp housing 16' mounted to the interior of the window 14 and immediately opposite the decal 12.

As shown in FIGS. 1-4, the decal 12 resembles the logo for the Los Angeles Dodgers, except in this embodiment the logo is shown in a "landscape" orientation rather than a "portrait" orientation as shown in FIGS. 1-4. Utilizing the alternative lamp housing 16, a new decal may be placed on the vehicle corresponding to another design, such as that illustrated in FIG. 8. In this embodiment, the decal 12 attached to the exterior of the vehicle window 14 will still preferably comprise a polycarbonate or acrylic substrate 18 approximately 1/16 inch thick, or any other suitable flexible decal-like substrate, formed generally in the overall shape of the logo or design. A substrate 18 is preferably translucent as to transmit light when illuminated from the rear by the lamp housing 16'. A clear adhesive covers the back of the decal 12 so that it may be firmly yet removably attached to the window 14 of the vehicle. On the front face of the decal 12, the design 20' is applied so that all peripheral edges of the design have a portion of the translucent substrate 18 which extends therefrom. The design 20' itself is preferably of an opaque color easily seen during daylight hours, but which will prevent the transmission of light directly therethrough from the rear. However, as mentioned above, the design 20' may be of a dark translucent color also easily seen during daylight hours, but which will allow transmission of some light therethrough from the rear during night time hours. The lamp housing 16' comprises a relatively rigid tray 22' having adhesive strips 24' or 3M Dual-Lock attachments at the corners thereof for adhering the housing 16' to the interior of the vehicle window 14. The same electronics module 26 as described in connection with the embodiment of FIGS. 1-4 is fixed to the rear of the lamp housing 16'.

Figure 7:
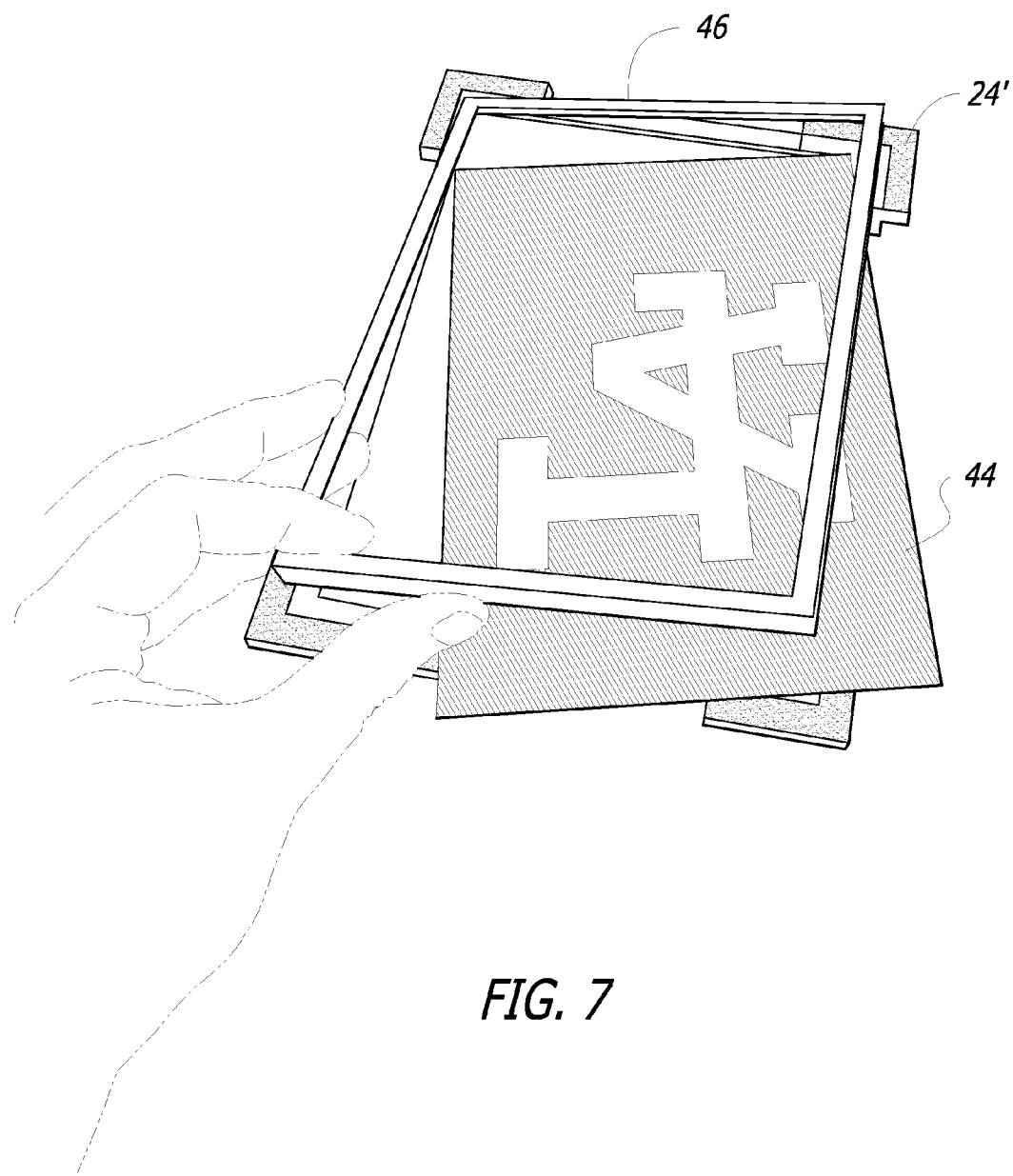
FIG. 7 is a perspective view of the tray 22 of FIGS. 5 and 6, illustrating removal of a mask 44 from the tray 22 of FIGS. 5 and 6.
Figure 8:
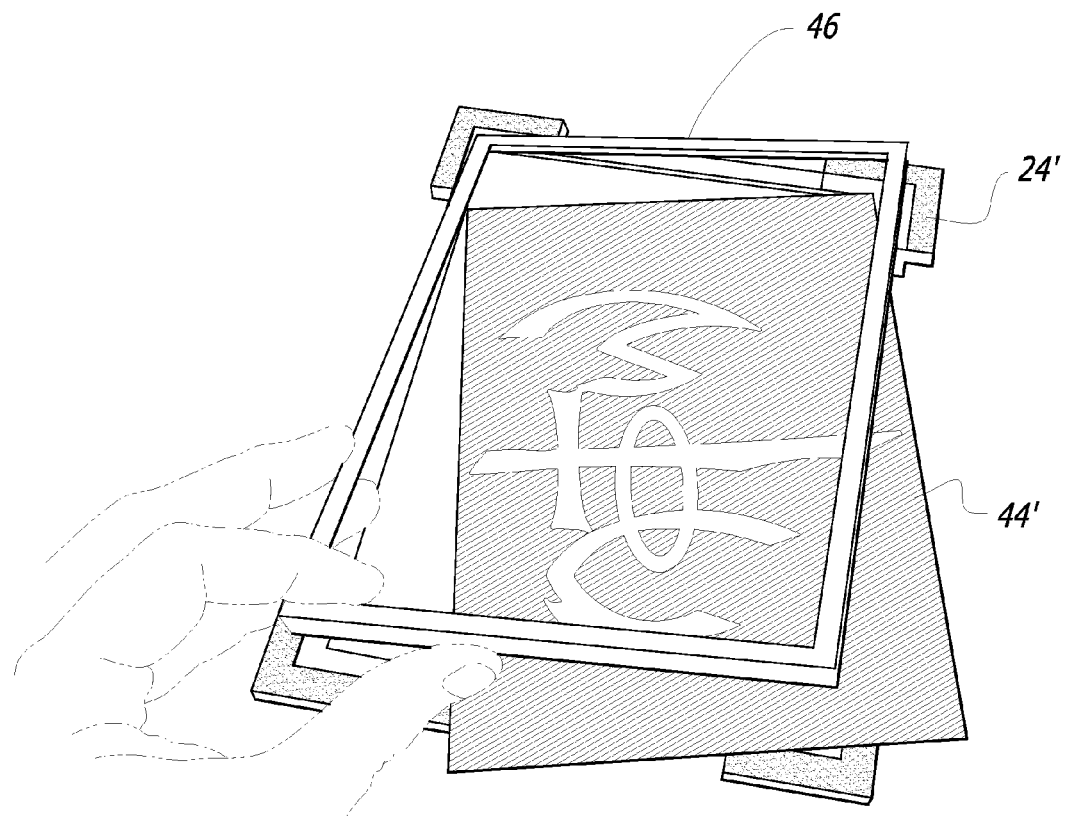
FIG. 8 is a perspective view similar to FIG. 7, illustrating insertion of a new mask into the tray.
Figure 9:
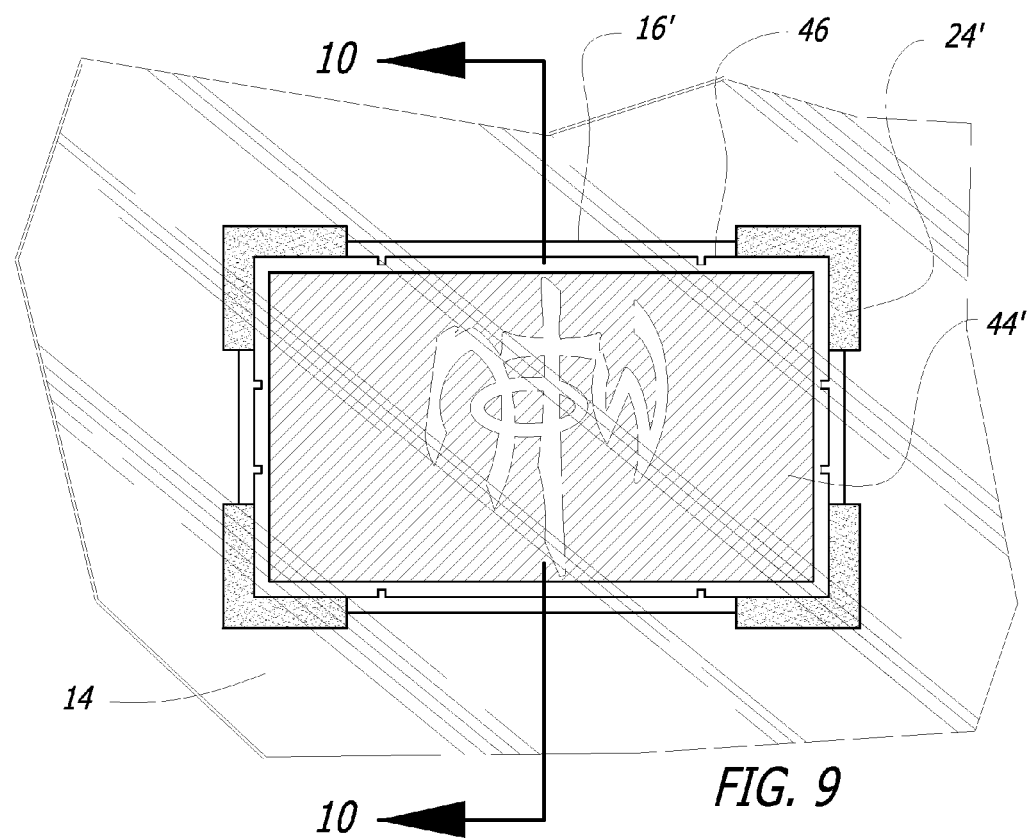
FIG. 9 is a front elevational view of the lamp housing 16, including the tray, affixed to a vehicle window.
Figure 10:
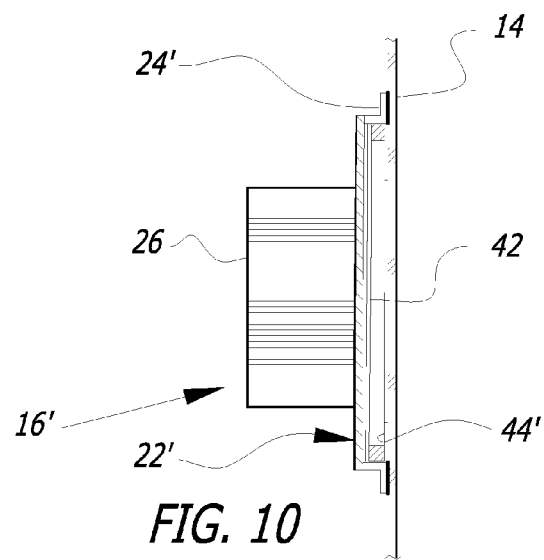
FIG. 10 is a sectional view taken generally along the line 10-10 of FIG. 9.

The lamp housing includes a protective transparent sheet of material 42 which provides a protective screen over the front face of the lamp housing 16, a partially opaque mask 44 (similar to the opaque covering 38 of FIGS. 1-4) configures as to permit light to emit from the front face of the tray only directly behind the opaque features or design 20 of the exterior decal 12, and a fastening ring 46 capable of clamping onto the tray 22 to firmly hold the transparent sheet 42 and the mask 44 in place. This construction permits alternative designs of the decal 12 to be utilized and changed out from time to time (See FIG. 6). As shown in FIG. 7, the fastening frame 46 may be disengaged from the tray 22 to allow a user to remove the mask 44 from the lamp housing 16'. Afterwards, as illustrated in FIG. 8, a new or alternative mask 44' may be placed adjacent to the transparent sheet 42 and then clamped into place by the fastening frame 46. A decal 12' of a design similar to that found in the new mask 44 may then be placed on the outside of the vehicle window 14 as described above.

Although several embodiments have been described in detail for purposes of illustration, various modifications may be made without departing from the spirit and scope of the invention. For example, although in the preferred embodiment the non-opaque portion 40 of the front face of the tray 22 is aligned immediately behind the opaque portion 20 on the exterior decal 12, depending on the translucent qualities of the decal substrate, it may be desirable to enlarge the non-opaque portion to extend beyond the periphery of the opaque portion of the decal and directly light exposed portions of the translucent substrate of the decal. Accordingly, the invention is not to be limited, except as by the appended claims.

What is claimed is:

1. A lighted sign for a vehicle, comprising:
    a decal disposed on an exterior surface of a window of the vehicle;
    a design disposed on a front face of the decal, the design having an ornamental configuration;
    a lamp housing disposed on an interior surface of the window underlying the decal, wherein a front face of the lamp housing has an opaque portion and a non-opaque portion, the non-opaque portion having a shape similar to the decal or the design; and
    an illumination source disposed in the lamp housing and configured to illuminate the front face of the lamp housing.

2. The lighted sign of claim 1, wherein the decal comprises a translucent or transparent substrate configured to transmit light from the illumination source.

3. The lighted sign of claim 2, wherein the design comprises an opaque color or dark translucent color, and a portion of the substrate extends from every edge of the ornamental configuration.

4. The lighted sign of claim 1, wherein the illumination source includes an on/off switch, a light sensor, and a motion sensor, all connected to a power source.

5. The lighted sign of claim 4, wherein the power source comprises a battery in the lamp housing or the vehicle.

6. The lighted sign of claim 1, wherein the non-opaque portion of the front face of the lamp housing is transparent, translucent, or of a predetermined color.

7. The lighted sign of claim 1, wherein the lamp housing comprises a removable and replaceable mask defining the opaque portion and non-opaque portion of the front face of the lamp housing.

8. The lighted sign of claim 7, wherein the lamp housing comprises a tray and a fastening ring removably affixed to the tray, the tray and fastening ring configured to removably retain the mask and a transparent sheet therebetween.

9. The lighted sign of claim 1, wherein the decal is removable and replaceable with an alternate decal having a different design with a different ornamental configuration.

10. The lighted sign of claim 9, wherein the front face of the lamp housing is replaceable with an alternate front face having a different opaque portion and a different non-opaque portion, wherein the different non-opaque portion has a shape similar to the alternate decal or the different design.

11. A lighted sign for a vehicle, comprising:
    a decal disposed on an exterior surface of a window of the vehicle;
    a design disposed on a front face of the decal, the design having an ornamental configuration;
    a lamp housing disposed on an interior surface of the window underlying the decal, wherein a front face of the lamp housing has an opaque portion and a non-opaque portion, the non-opaque portion having a shape similar to the decal or the design; and
    an illumination source disposed in the lamp housing and configured to illuminate the front face of the lamp housing; wherein the illumination source includes an on/off switch, a light sensor, and a motion sensor, all connected to a power source; wherein the decal comprises a translucent or transparent substrate configured to transmit light from the illumination source.

12. The lighted sign of claim 11, wherein the design comprises an opaque color or dark translucent color, and a portion of the substrate extends from every edge of the ornamental configuration.

13. The lighted sign of claim 11, wherein the power source comprises a battery in the lamp housing or the vehicle.

14. The lighted sign of claim 11, wherein the non-opaque portion of the front face of the lamp housing is transparent, translucent, or of a predetermined color.

15. The lighted sign of claim 11, wherein the lamp housing comprises a removable and replaceable mask defining the opaque portion and non-opaque portion of the front face of the lamp housing, wherein the lamp housing comprises a tray and a fastening ring removably affixed to the tray, the tray and fastening ring configured to removably retain the mask and a transparent sheet therebetween.

16. The lighted sign of claim 11, wherein the decal is removable and replaceable with an alternate decal having a different design with a different ornamental configuration, wherein the different non-opaque portion has a shape similar to the alternate decal or the different design.

17. A lighted sign for a vehicle, comprising:
    a decal disposed on an exterior surface of a window of the vehicle;
    a design disposed on a front face of the decal, the design having an ornamental configuration, wherein the decal is removable and replaceable with an alternate decal having a different design with a different ornamental configuration;
    a lamp housing disposed on an interior surface of the window underlying the decal, wherein a front face of the lamp housing has an opaque portion and a non-opaque portion, the non-opaque portion having a shape similar to the decal or the design, wherein the non-opaque portion of the front face of the lamp housing is transparent, translucent, or of a predetermined color; and an illumination source disposed in the lamp housing and configured to illuminate the front face of the lamp housing wherein the illumination source includes an on/off switch, a light sensor, and a motion sensor, all connected to a power source wherein the decal comprises a translucent or transparent substrate configured to transmit light from the illumination source.

18. The lighted sign of claim 17, wherein the design comprises an opaque color or dark translucent color, and a portion of the substrate extends from every edge of the ornamental configuration, wherein the power source comprises a battery in the lamp housing or the vehicle.

19. The lighted sign of claim 17, wherein the lamp housing comprises a removable and replaceable mask defining the opaque portion and non-opaque portion of the front face of the lamp housing, wherein the lamp housing comprises a tray and a fastening ring removably affixed to the tray, the tray and fastening ring configured to removably retain the mask and a transparent sheet therebetween.

20. The lighted sign of claim 17, wherein the front face of the lamp housing is replaceable with an alternate front face having a different opaque portion and a different non-opaque portion, wherein the different non-opaque portion has a shape similar to the alternate decal or the different design.

\* \* \* \* \*